United States Patent [19]

Gavrilenko et al.

[11] 4,304,090
[45] Dec. 8, 1981

[54] PICKUP OF AN AGRICULTURAL MACHINE

[76] Inventors: Boris P. Gavrilenko, ulitsa Matrosskaya, 9, kv. 54; Valery V. Markov, prospekt Selmash, 102a, kv. 31; Leonid P. Minenko, ulitsa Narimanova, 72/1, kv. 6; Ljubov V. Bobrysheva, ulitsa Axaiskaya, 69/1, kv. 69, all of Rostov-na-Donu, U.S.S.R.

[21] Appl. No.: 120,300

[22] Filed: Feb. 11, 1980

[51] Int. Cl.³ .................... A01D 43/00; A01D 75/00
[52] U.S. Cl. ........................................ 56/364; 56/190
[58] Field of Search .................. 56/364, 400, 400.01, 56/400.02, 400.14, 400.19, 400.2, 400.21, 190

[56] References Cited

U.S. PATENT DOCUMENTS

| | | | |
|---|---|---|---|
| 716,912 | 12/1902 | MacPhail | 56/400 |
| 1,515,927 | 11/1924 | Claire | 56/400.2 |
| 2,362,861 | 11/1944 | Russell | 56/341 |
| 2,468,376 | 4/1949 | Peeples | 56/400.21 |
| 2,570,065 | 10/1951 | Melroe | 56/364 |
| 2,603,936 | 7/1952 | Keene | 56/400 |
| 2,647,355 | 8/1953 | Luke | 56/343 |
| 2,691,266 | 10/1954 | Meyer et al. | 56/341 |
| 2,872,772 | 2/1959 | Nolt | 56/364 |
| 3,924,391 | 12/1975 | Cheatum | 56/364 |

*Primary Examiner*—Paul J. Hirsch
*Attorney, Agent, or Firm*—Robert E. Burns; Emmanuel J. Lobato; Bruce L. Adams

[57] ABSTRACT

A characteristic feature of the present invention resides in the fact that in the pickup of an agricultural machine, incorporating a pickup-and-conveying mechanism driven from said farm machine and held to a frame which is articulated to the machine and rests upon the ground by the support wheels thereof, a grate composed of a beam carrying levers rigidly fixed at the beam ends and of a number of rods fitted into the holes in the beam so as to be cantilevered thereto, said grate being articulately suspended from said frame above the pickup-and-conveying mechanism, adjustable limit stops made fast on said frame and adapted for the beam levers to rest against, relieving links carrying elastic members and held with one of their ends to agricultural machine, provision is made for a number of cranks rigidly fixed on the grate beam, the journals of said cranks being connected to the other ends of the relieving links and being so arranged that the line of action of the relieving links establishes a moment effective for forcing the levers against the limit stops.

5 Claims, 5 Drawing Figures

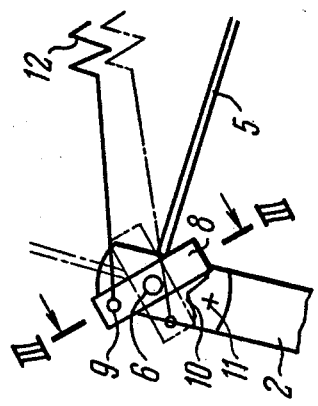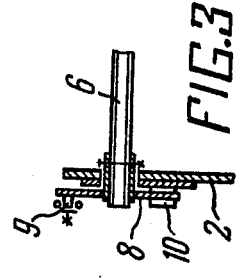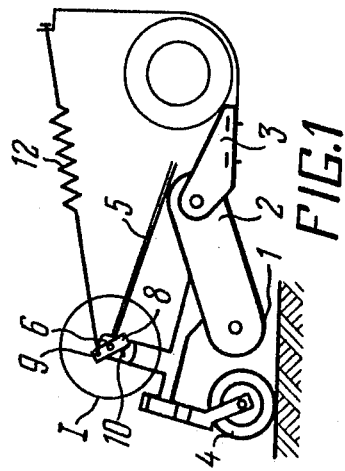

PICKUP OF AN AGRICULTURAL MACHINE

BACKGROUND OF THE INVENTION

The present invention relates to agricultural engineering and more specifically to pickups of agricultural machines.

The invention is applicable for picking from the ground various farm crops that have been mown down and either windrowed or spread.

A number of various pickups of agricultural machines are known to use in farm practice currently. The majority of these incorporate a pick-up-and-conveying mechanism driven from the agricultural machine it is teamed with, and a frame articulately suspended from said machine and resting upon the ground through the support wheels, said frame carrying said mechanism. To prevent the mass being picked from sweeping by wind and penetrating into the intake portion of the agricultural machine, a grate is provided on the pickup-and-conveying mechanism, said grate being, in a general case, essentially a beam fastened on the frame and a number of rods cantilevered to said beam in the direction of feed of the mass being picked. The grate can be either rigidly fixed on the frame or suspended therefrom articulately. In the latter case in order to restrict the downward turn of the grate, a number of levers are made fast on the beam, whereas provided on the frame are limit stops for said levers to rest against. The limit stops are as a rule made adjustable, e.g., as a bolt turned into the threaded hole in the frame and secured with a locknut so that the levers rest against the bolt head.

A disadvantage of the above-described rigid grate-to-frame fastening resides in that one cannot adjust the clear passage between the pickup-and-conveying mechanism and the rods to suit the weight and thickness of the windrow being picked.

A disadvantage of the above-described articulately suspended grate resides in the fact that the grate turning is restricted only in one direction (downwards), the grate might perform vibrating motion directed upwards, caused by vibration of the pickup while following the ground contour, with the result that the initially set clear passage is affected, whereby the direction of the discharge of the mass from the pickup-and-conveying mechanism is changed, and the intake end of the agricultural machine gets clogged.

A disadvantage of the cantilever arrangement of the grate rods resides in that the rods are liable to break at the places of their securing to the beam, this being due to reversal loads arising from the action of the mass being picked upon the rods and owing to constrained vibrations of the rods called forth by the vibration of the pickup.

Moreover, a disadvantage of the constructions described above consists in an inconvenient attendance of the pickup and the agricultural machine intake due to their being covered by the grate rods. Hinge-mounted grates can be swung aside to gain access to the intake of the agricultural machine but this results in that the grate rods cover the front portion of the pickup-and-conveying mechanism.

A constructional disadvantage of the afore-described adjustable restrictor is the fact that its adjustment changes the relative positions of the restrictor bearing surfaces (the bolt head) and of the lever, inasmuch as the lever turns about the grate suspension axis, whereas the restrictor moves translationally while being adjusted. As a result, a linear contact is usually liable to occur which brings about mutilation of the contacting surfaces.

SUMMARY OF THE INVENTION

It is the main object of the present invention to provide a higher quality of feeding the mass being picked to the intake of an agricultural machine as compared to the known pickups.

In another object of the present invention to provide convenient and safe attendance of the pickup and the agricultural machine.

It is one more object of the present invention to attain higher constructional reliablity of the pickup.

This and other objects are achieved due to the fact that the pickup of an agricultural machine, incorporates a pickup-and-conveying mechanism driven from said agricultural machine and held to a frame hinge-mounted on the machine and resting upon the ground with its support wheels, a grate made up of a beam carrying levers fixed in place at the beam ends, and a number of rods fitted into the holes in the beam and cantilevered thereto, said grate being suspended articulately from said frame above the pickup-and-conveying mechanism, a number of adjustable limit stops made fast on said frame and adapted for the beam levers to rest against, a number of relieving links carrying elastic members and held with one of their ends to the agricultural machine, according to the invention is provided with a number of cranks rigidly fixed on the grate beam, the journals of said cranks being connected to the other ends of the relieving links and being so arranged that the line of action of the relieving links establishes a moment effective for forcing the levers against the limit stops.

The shape and arrangement of the levers are so selected as to provide fixing of the grate when turned to the position gaining access to the pickup and the agricultural machine intake for maintenance, by virtue of a moment established by the relieving links, said moment being opposite to the moment forcing the levers against the limit stops in the working position of the grate.

The limit stops are expedient to be so mounted as to change their position along an arc whose centre aligns with the suspension axis of said grate and to be rigidly fixed in any required position.

The crank is expedient to be made integral with said lever so that the lever be at the same time the crank web.

The rods are to be fitted into the beam holes so that the rod end to be held in place be shaped as a $\beta$-shaped loop provided with a hook to catch the loose end of said rod.

The essence of the present invention consists in the following Interconnection of the relieving links with the crank journals made fast on the grate beam provides for constant forcing of the levers against the limit stops by virtue of the elastic members provided in said links, whereas the grate rods are constantly forced against the mass being conveyed. This prevents the grate from vibrating motion upwards with respect to the limit stops and provides for a constant preadjusted direction of feeding the mass to the intake of the agricultural machine.

Thanks to appropriately selected shape and arrangement of the levers and limit stops the grate can be fixed in a position most convenient for maintenance, usually one approximating the vertical position of the rods thereof, by virtue of a moment established by the elastic members of the relieving links and applied to force the respective surface of the lever against the surface of the limit stop adapted for the purposed.

Provision of a possibility for the limit stop to be adjustable along an arc so as to control the position of the grate and the fact that the centre of said arc aligns with the axis of the grate suspension provides for a surface contact of the levers with the limit stops which reduces contact stresses.

Using the levers as the crank webs makes the construction simpler.

Provision of the rod end held to the beam as a β-shaped loop with the hook for catching the rod loose end results in that when the rod is fitted into the beam hole, portion of the rod loop embraces the pipe, thus attaching the rod to the pipe without any additional fastening element, whereas the hook at the loop end, while catching the rod loose end, thereby reduces the overhung length and establishes an additional support.

As a result, the conditions for feeding the mass picked up to the agricultural machine intake are favoured, the maintenance of the pickup and the agricultural machine are made convenient and safe, the pickup construction is made more reliable and its construction is simplified due to combined functions of some individual elements thereof and dispensing with some fastening pieces.

BRIEF DESCRIPTION OF THE DRAWING

To promote understanding of the essence of the present invention appended to the disclosure thereof are the drawings of a specific illustrative embodiment of a pickup, according to the invention. In the drawings:

FIG. 1 is a general side-elevation view of the pickup of an agricultural machine, shown as situated on the machine intake portion;

FIG. 2 is an enlarged view of unit I of the grate suspension;

FIG. 3 is a section taken along the section line III—III in FIG. 2;

DESCRIPTION OF THE PREFERRED EMBODIMENTS

Figure 4:
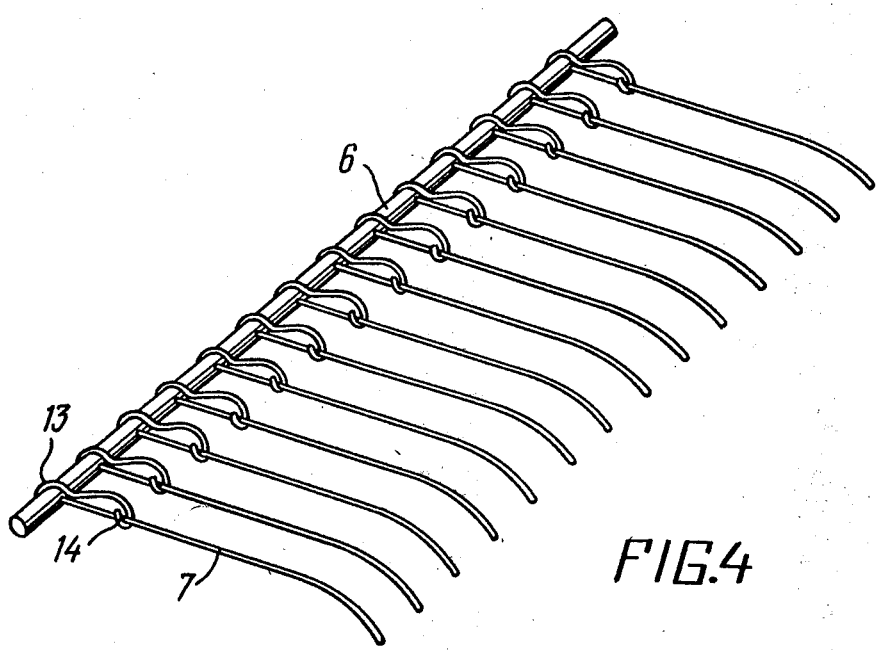
FIG. 4 is a perspective view of the grate shown conventionally less the levers and cranks and FIG. 5 illustrates the grate rod before its fitting into the beams.

The scope of the disclosed intention is wider than the specific exemplary embodiment thereof set forth in the present disclosure to illustrate the present invention, and is defined by the claims that follow.

The drive of the pickup and the stripper of the mass are not shown in the drawings as having no relevance to the essence of the present invention.

Figure 5:
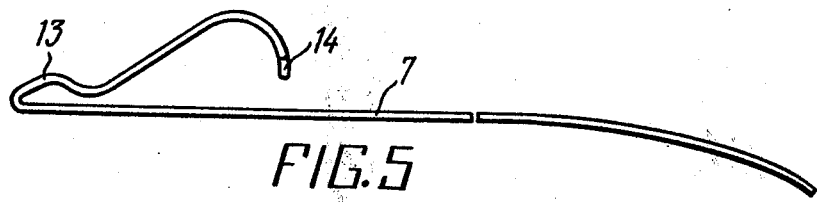

The pickup (FIGS. 1 through 5) consists of a pickup-and-conveying mechanism 1, e.g, a conveyer with the picking fingers, fastened on a frame 2 which is hinge mounted on the machine through brackets 3 and rests upon the ground with its support wheels 4. A grate 5 is articulately suspended from the frame 2. The grate being made up of a beam 6 with a number of holes, and a plurality of rods 7. The ends of the beam 6 carry levers 8 rigidly fixed thereto and serving at the same time as crank webs to which crank journals 9 are held. Limit stops 10 are mounted on the frame 2 adjustably along an arc whose centre aligns with the swivel axis of the grate 5, and are secured on the frame by a bolted joint 11. Relieving links 12 with one of their ends are fixed to the agricultural machine and with the other ends, to the crank journals 9. The end of each rod 7 of the grate 5 to be held to the beam is shaped as a β-shaped loop having a saddle 13 and a hook 14. The saddle 13 is to embrace the beam 6 and lock the rod 7 against lengthwise displacement. The hook 14 is engaged with the loose end of the rod 7 after its having been inserted into a corresponding hole in the beam 6.

When the pickup operates the relieving links 12 establish, by virtue of the cranks, a moment applied to force the levers 8 against the limit stops 10 and concurrently, the rods 7 of the grate 5 against the mass being conveyed, which precludes any free vibrations of the grate and provides for a constant preset direction of conveyance of the mass. At the same time the relieving links 12, while acting through the levers 8 and the limit stops 10 establish a moment about the axis of suspension of the frame 2 which relieves the support wheels 4.

An angular position of the grate 5 with respect to the pickup-and-conveying mechanism 1 is adjustable to suit the weight and thickness of the windrow by a joint turning of the limit stops 10 and the grate 5 along with the levers 8 round a common swivel or pivot axis which provides for a constant area of contact of the levers 8 with the limit stops 10.

Whenever it becomes necessary to attend the intake of the agricultural machine the grate 5 is swung upwards till the levers 8 thrust against the limit stops 10 (this position is illustrated in FIG. 2 by a dash-and-dot line). In this case the crank journals 9 assume such a position that the relieving links 12 establish a moment opposite to the working moment, thus locking the grate in the swung-up position.

The hook 14 of the rod 7, when locked, serves as an additional support of the rod, spaced somewhat apart from the rod-to-beam holding point.

The present invention can find most utility when applied for picking various agricultural crops within a practically unrestricted range of harvest yielding capacity.

What is claimed is:

1. Pickup mechanism for an agricultural machine comprising, a driven pickup conveyor for picking up a crop to be harvested upon a field and transporting the crop rearwardly in a direction away from the direction of advance of the agricultural machine, a grate comprising a plurality of pivotally mounted laterally spaced rods extending generally in a common direction rearwardly and operable jointly to a lowered position for holding down the crop on the pickup conveyor and to a raised position, to allow access to the mechanism, a crank lever for operating the grate rods to the lowered and raised positions alternatively, mounting means pivotally mounting the crank lever and the grate rods, elastic means biasing the crank lever in a direction for moving the grate rods jointly to the lowered position and maintaining them in position for holding down said crop transported by the pickup conveyor, a limit stop on said mounting means, and the elastic means having enough elasticity to allow the grate rods to be moved upwardly jointly and the crank lever rotated in an opposite direction against the limit stop and to a position in which the elastic means apply a biasing force on the crank lever locking it against the limit stop, whereby the grate rods are releasably locked in said raised position.

2. Pickup mechanism for an agricultural machine according to claim 1, in which said mounting means includes a beam pivotally mounted and on which the grate rods are secured spaced axially thereon.

3. Pickup mechanism for an agricultural machine according to claim 2, in which said beam has a plurality of holes extending transversely thereof axially spaced and said grate rods extend through corresponding holes on the beam.

4. Pickup mechanism for an agricultural machine according to claim 2, in which the limit stop is adjustable vertically at positions disposed on an arc having a center coaxial with an axis about which the grate rods pivot.

5. Pickup mechanism for an agricultural machine according to claim 2, in which said mounting means includes a beam pivotally mounted and on which the grate rods are removably secured spaced axially thereon extending parallel in a generally common direction, said beam having a plurality of holes extending transversely thereof and into which said grate rods extend, each rod being made of a bendable material and each having a hook disposed reversibly bent over the beam and around the corresponding rod to retain the rod from movement axially relative to the beam.

* * * * *